United States Patent [19]

Breed

[11] Patent Number: 4,479,508
[45] Date of Patent: Oct. 30, 1984

[54] REINFORCED VALVE MEMBER

[75] Inventor: William F. Breed, Enid, Okla.

[73] Assignee: George E. Failing Company, Enid, Okla.

[21] Appl. No.: 427,175

[22] Filed: Sep. 29, 1982

[51] Int. Cl.³ .............................................. F16K 15/02
[52] U.S. Cl. ........................... 137/516.25; 137/543.23; 137/DIG. 3; 251/368
[58] Field of Search ...................... 137/516.25, 516.27, 137/516.29, 533, 533.17, 540, 543.21, 534.23, DIG. 3; 251/368

[56] References Cited

U.S. PATENT DOCUMENTS

| | | | |
|---|---|---|---|
| 970,249 | 9/1910 | Mack | 137/DIG. 3 |
| 1,327,564 | 1/1920 | McDougall | 137/516.27 X |
| 1,506,012 | 8/1924 | Lewis | 137/843 |
| 1,588,874 | 6/1926 | Current | 137/DIG. 3 |
| 1,844,159 | 2/1932 | Hamer | |
| 1,976,849 | 10/1934 | Hewitt | 137/543.21 |
| 2,327,600 | 8/1943 | Kennon | 137/DIG. 3 |
| 2,792,016 | 5/1957 | Shellman | 137/516.29 |
| 3,419,041 | 12/1968 | Jennings | 251/368 X |
| 3,438,391 | 4/1969 | Yocum | 251/368 X |
| 3,943,969 | 3/1976 | Rubin | |

FOREIGN PATENT DOCUMENTS

| | | | |
|---|---|---|---|
| 1099296 | 2/1961 | Fed. Rep. of Germany | 137/516.25 |
| 246631 | 2/1926 | United Kingdom | 251/368 |
| 499981 | 2/1939 | United Kingdom | 137/516.29 |

Primary Examiner—Robert G. Nilson
Attorney, Agent, or Firm—Litman, Day & McMahon

[57] ABSTRACT

A reinforced valve member including a body having upstream and downstream sides and an annular rim forming a first sealing surface. A frusto-conical portion of the body extends upstream from the first sealing surface and displays a second sealing surface. A substantially conical flow diverter extends upstream from the frusto-conical portion and a plurality of guide fins extend upstream from the flow diverter. The annular rim, frusto-conical portion and flow diverter are all coaxially aligned on the longitudinal axis of translation of the valve member. A dish-shaped reinforcing washer is embedded in the valve member body and includes a concave side oriented upstream and a convex side oriented downstream.

12 Claims, 4 Drawing Figures

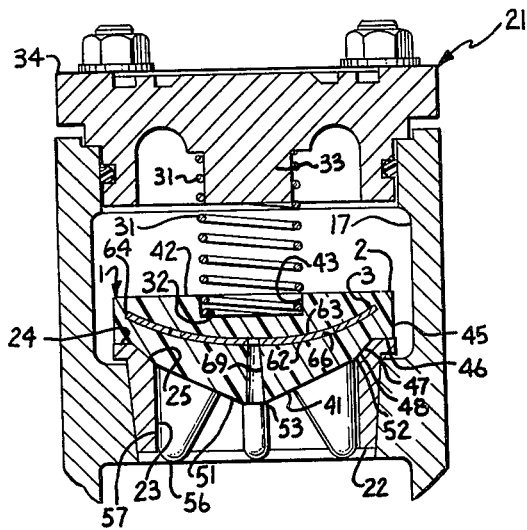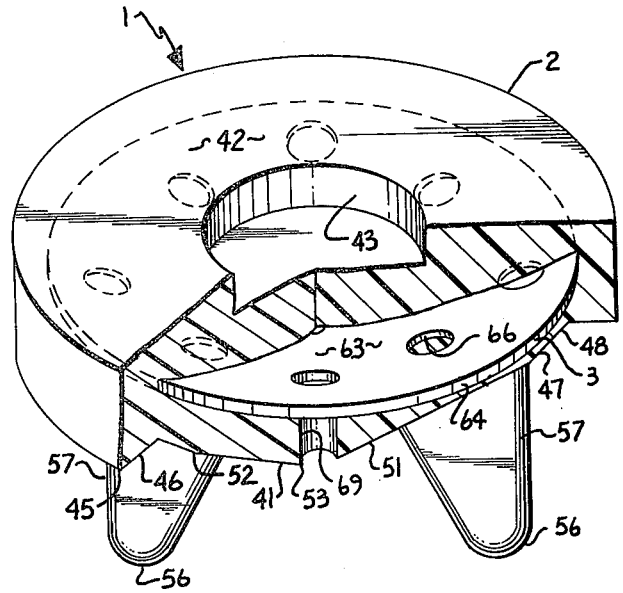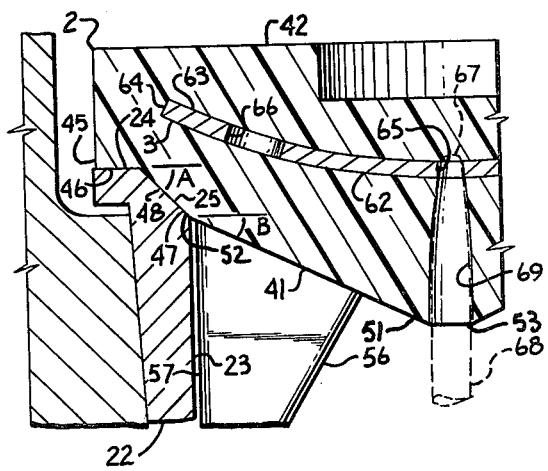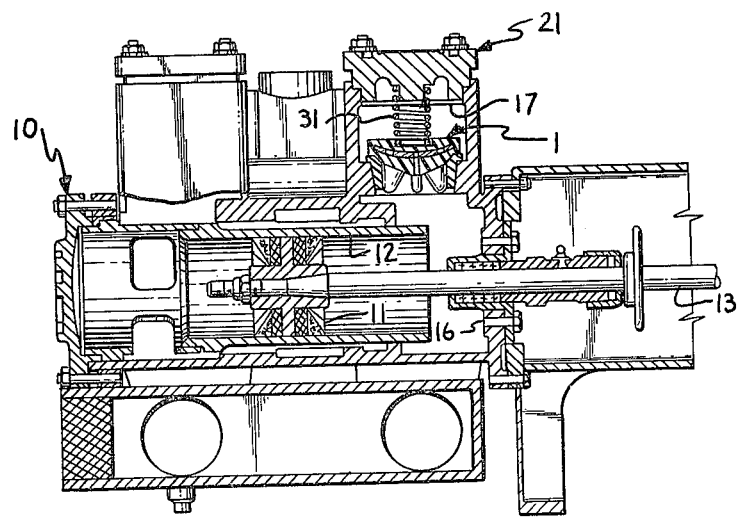

REINFORCED VALVE MEMBER

BACKGROUND OF THE INVENTION

1. Field of the Invention

This invention relates to valve members and in particular to an automatic-lift type valve member for use in a slush or mud pump.

2. Description of the Prior Art

In the drilling industry, slush or mud pumps are utilized to circulate the drilling fluid or mud which counterbalances the pressure of oil, gas and the like. The drilling fluid generally comprises a suspension in water of fine-grained mineral matter such as cuttings from the drilling operation and may also include cottonseed hulls and chemical additives. Furthermore, depending upon the composition of the matter being drilled through, sand and gravel may be introduced into the drilling fluid and circulated therewith. Because of its composition of such elements, drilling fluid tends to be relatively abrasive.

One type of slush pump commonly used to circulate the drilling fluid comprises a reciprocating type pump with automatic-lift type suction and discharge valves. The conventional valves typically include an insert comprising a soft material such as neoprene, urethane or the like for mating with a valve seat in a sealing engagement. The insert is sandwiched between a metal body with guide fins extending upstream therefrom and a metal washer; the entire assembly being held together by a bolt.

Such slush pump valves have heretofore been accepted as the industry standard. However, such conventional slush pump valves frequently have problems in opening, closing and sealing. Due to the abrasive nature of the drilling fluid and the extreme operating pressures to which slush pumps are subjected, such conventional valves employed therein tend to fail prematurely. Such failures often occur when a piece of gravel or other matter becomes lodged between the seat and the insert whereby the valve member is prevented from fully closing and sealing such that drilling fluid is allowed to leak therepast. Due to the high pressure and abrasive characteristics of the drilling fluid, such leakage tends to rapidly erode the insert and cause a valve failure. Drilling operations must then be suspended until the failed valve can be replaced.

Yet another disadvantge of the conventional slush pump valves heretofore described is that the inserts thereof generally have the configuration of a flat washer, one face of which provides the only sealing surface of the valve member. Damage to this face may result in a leaky valve. Furthermore, since the sealing face of a conventional valve insert is oriented substantially normal to the direction of drilling fluid flow, it tends to somewhat impede the flow and be eroded thereby in a relatively short time.

A further disadvantage of such conventional slush pump valves relates to their relatively high cost due to the use of precision machined metal parts and a high labor content for assembly. Therefore, conventional slush pump valves tend to be relatively costly to manufacture, inefficient in operation and susceptible to premature failure.

SUMMARY OF THE INVENTION

In the practice of the present invention, a reinforced valve member is provided which includes a body having upstream and downstream sides. An annular rim extends upstream from the body downstream side and has a first sealing surface. A frusto-conical portion of the body extends upstream from the first sealing surface and has a second sealing surface. A substantially conical flow diverter extends upstream from the frusto-conical portion and has a plurality of radially oriented, spaced guide fins extending therefrom. A reinforcing washer having a dishshaped configuration is embedded in the valve member body and has a convex upstream side and a concave downstream side. A plurality of openings extend through the reinforcing washer and are adapted to receive a polymeric material comprising the body whereby portions of the body on either side of the washer are integrally bonded together. Simplicity and economy in manufacture are provided because the entire body is unitarily formed.

OBJECTS OF THE INVENTION

The principal objects of the present invention are: to provide a reinforced valve member for use in automatic-lift type valve assemblies; to provide such a valve member which is particularly well adapted for use in slush pumps; to provide such a valve member which is capable of withstanding relatively high fluid pressures; to provide such a valve member which is adpated to resist damage from contact with abrasive fluid; to provide such a valve member which includes a unitary polymeric body; to provide such a valve member which includes a reinforcing washer embedded in the body; to provide such a valve member which includes a flow diverter for improved flow characteristics; to provide such a valve member with relatively few parts; and to provide such a valve member which is economical to manufacture, efficient in use, capable of a long operating life and particularly well adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a vertical, cross-sectional view of the head end of a slush pump with valve members embodying the present invention.

FIG. 2 is an enlarged, vertical cross-sectional view of a valve assembly with a valve member embodying the present invention.

FIG. 3 is a perspective view of the valve member with portions broken away to reveal internal construction.

FIG. 4 is an enlarged, fragmentary, vertical cross-sectional view of the valve assembly particularly showing sealing surfaces thereof.

DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 designates a reinforced valve member generally comprising a body 2 and a reinforcing member or washer 3. The valve member 1 is particularly adapted for use in the fluid end 10 of a slush or mud pump. The slush pump fluid end 10 includes a piston 11 adapted for being reciprocated within a cylinder 12 by a connecting rod 13 operably connected to the power end (not shown) of the slush pump. Although the reinforced valve 1 of the present invention is shown in the slush pump fluid end 10 for operation in a discharge valve assembly 21 it will be appreciated that the reinforced valve member 1 may also function as a suction valve assembly with the same inherent advantages.

In the slush pump fluid end 10, the discharge valve assembly 21 is provided for controlling one-way flow of drilling fluid from a compression chamber 16 to a discharge chamber 17. The discharge valve assembly 21 includes a valve seat 22 with a cylindrical bore 23 extending therethrough and terminating in a first seat face 24 on the downstream side of the valve seat 22. The first seat face 24 has a substantially flat, annular configuration. A second seat face 25 having a beveled or frusto-conical configuration extends upstream from the first seat face 24 to the valve seat bore 23.

The reinforced valve member 1 is normally urged into sealing engagement with respect to the valve seat 22 by a helical valve return spring 31 having an upstream end 32 engaging the valve member 1 and a downstream end 33 engaging a valve assembly cover plate 34 secured in sealing relation over the discharge chamber 17.

The valve member body 2 has upstream and downstream sides 41 and 42 respectively and a longitudinal translational axis extending notionally therethrough. A blind spring receiver 43 is open to the body downstream side 42 and is coaxial with the valve member translational axis. The spring receiver 43 is adapted to receive the upstream end 32 of the spring 31. Although a blind spring receiver 43 is shown, a knob, protrusion or the like extending from the valve member downstream side 42 coaxially with the valve member translational axis may be used in place thereof to retain the spring 31.

An annular ring 45 surrounds the body 2 adjacent its downstream end 42 and displays a first sealing surface 46 having a flat, annular configuration corresponding to that of the first valve seat sealing surface 24. A frusto-conical portion 47 of the valve member body 2 extends in an upstream direction from the first valve member sealing surface 46. The frusto-conical portion 47 displays a second valve member sealing surface 48 having a beveled configuration corresponding to that of the second valve seat sealing surface 25. The frusto-conical portion 47 forms a notional base angle designated "A".

A substantially conical flow diverter 51 extends in an upstream direction from the frusto-conical portion 47 and forms a demarcation line 52 with respect to the second valve member sealing surface 48. The flow diverter forms a notional base angle "B" which is less than base angle "A" of the frusto-conical portion 47. The flow diverter 51 terminates at an apex 53 at the body upstream end 41. The annular ring 45, the frusto-conical portion 47 and the flow diverter 51 are aligned coaxially on the translational axis of the reinforced valve member 1.

A plurality of triangular-shaped guide fins 56 each having an outer edge 57 adapted for longitudinal sliding engagement with the valve seat bore 23 extend from the flow diverter 51. In the illustrated embodiment, four spaced guide fins 56 are provided and extend radially from the valve member translational axis at approximately 90 degree intervals. However, more or fewer guide fins 56 may be successfully employed with the present invention.

The valve member body 2 preferably comprises a molded polymeric material. Without limitation of the generality of useful materials, polyurethane has been found to be well adapted for use in slush pumps because of its characteristics of abrasion resistance and compatibility with most of the chemicals encountered in the drilling fluid. However, synthetic rubber materials including neoprene and the like may also be successfully employed with the present invention.

The reinforcing washer 3 is embedded in the reinforced valve member body 2 and has a dish-shaped configuration with a convex upstream side 62 and a concave downstream side 63. The reinforcing washer 3 has a peripheral edge 64 and the surfaces thereof have a roughened texture. A receiver 65 extends through the center of the washer 3 in alignment with the valve member translational axis. A plurality of spaced apertures 66 also extend through the washer 3 between its upstream and downstream sides 62 and 63 respectively. The reinforcing washer 3 comprises a harder material, for example steel, than that of the valve member body 2.

In forming the reinforced valve member 1, a tapered end 67 of a positioner pin 68 is inserted in the washer receiver 65. The washer 3 is then properly located within an injection mold (not shown) by means of the positioner pin 68 and the polymeric material is injected into the mold. The rough-textured surfaces of the washer 3 facilitate effecting a bonding engagement with the polymeric material. The liquid polymeric material fills the apertures 66 whereby portions of the body 2 on opposite sides of the washer 3 are securely bonded together to prevent separation of the washer from the body 2 when the valve member 1 is subjected to extreme pressure.

When sufficiently cured, the valve member body 2 is released from the injection mold the positioner pin 68 is slidably withdrawn from the washer receiver 65 and the valve member body 2. The positioner pin 68 leaves a positioner pin opening 69 extending from the diverter apex 53 to the washer receiver 65 in coaxial alignment with the translational axis of the valve member 1. If desired, the positioner pin opening 69 may be plugged with liquid polyurethane (not shown) which is allowed to harden therein. However, the positioner pin opening 69 has not been found to materially effect performance of the reinforced valve member 1 if left unfilled.

In operation as a discharge valve, the reinforced valve member 1 is normally biased to a closed position as shown in FIG. 2 by the valve spring 31 whereby the valve seat sealing surfaces 24 and 25 contact the respective valve member sealing surfaces 46 and 48 in sealing engagement. Drilling fluid is thus prevented from being extracted from the discharge chamber 17 into the compression chamber 16 on a retract stroke (in the direction to the left as shown in FIG. 1) of the piston 11. On a power stroke (in the direction to the right as shown in FIG. 1 the pressure of the drilling fluid automatically lifts the reinforced valve member 1 whereby the respective sealing surfaces are disengaged and drilling fluid flows under pressure from the compression chamber 16 to the discharge chamber 17 and thence into the well hole. The guide fins 56 function to limit movement of the valve member 1 to reciprocating movement along its translational axis in response to drilling pressure fluid differentials thereacross.

The configuration of the flow diverter 51 with its relatively shallow base angle "B" in cooperation with the somewhat greater base angle "A" of the frusto-conical portion 47 facilitates flow of the drilling fluid past the reinforced valve member 1 when open. The flow diverter 51 deflects the fluid flow outwardly and the frusto-conical configuration of the second sealing surface 48 continues the outward deflection of the fluid flow while somewhat directing it toward the valve member first sealing surface 46.

Furthermore, a higher fluid velocity may be achieved with the reinforced valve member 1 due to the configuration of its body 2 than was possible with conventional slush pump valves which included flat surfaces against which the fluid flow directly impinged and was thus slowed down. The beveled configurations of the flow diverter 51 and the frusto-conical portion 47 allow a higher fluid velocity which creates a turbulent drilling fluid flow across the sealing surfaces 24, 25, 46 and 48, removing debris which is generally found in drilling fluid therefrom. Such debris may comprise relatively fine mineral matter in suspension, cottonseed hulls, drill cuttings, sand and even gravel. By removing such debris, effective sealing engagements are facilitated between the respective sealing surfaces 24, 46 and 25, 48. Effective operating life of the reinforced valve member 1 thus tends to be longer than with conventional slush pump valves because debris which accumulates on the sealing surfaces may cause a valve 1 to leak. Leakage of abrasive drilling fluid under high pressure tends to erode a valve member relatively quickly and contributes to premature valve failure.

The respective configurations of the valve member body 2 and the reinforcing washer 3 cooperate to enable the reinforced valve member 1 to withstand relatively high drilling fluid pressures. The dish-shaped configuration of the reinforcing washer 3 is designed to achieve optimum surface compliance with the flow diverter 51 and the valve member sealing surfaces 46 and 48. Thus, loads exerted against the downstream (high pressure) side 42 are largely carried by the washer 3 and evenly distributed to the valve member sealing surfaces 46 and 48 whereby effective sealing engagement is afforded with the valve seat sealing surfaces 24 and 25.

The mechanical positioner opening 69 is extended to the upstream side 41 of the valve member body 2 because lower fluid pressures are encountered thereat than on the downstream side 42. Thus, the possibility of high pressure drilling fluid entering the opening 69 and causing the valve member body 2 and the reinforcing washer 3 to separate and delaminate is minimized.

In comparison with conventional slush pump valves, better sealing characteristics are afforded by providing two separate sets of matching sealing surfaces (i.e. 24 and 46, 25 and 48). In the event one set of corresponding sealing surfaces should be damaged and develop leakage, the other set of sealing surfaces is more likely to remain intact than with conventional slush pump valve members. Furthermore, the sealing surfaces of the valve member of the present invention tend to spread the closing impact over a somewhat larger area than with conventional slush pump valve members, whereby the likelihood of damage to either the body 2 or the valve seat 22 is somewhat lessened.

It is to be understood that while certain forms of the present invention have been illustrated and described herein, it is not to be limited to the specific forms or arrangement of parts described and shown.

What is claimed and desired to secure by Letters Patent is as follows:

1. A reinforced mud pump valve member, which comprises:
   (a) a body including:
      (1) an upstream side;
      (2) a downstream side;
      (3) a flat annular rim terminating upstream at a first flat, annular sealing surface; and
      (4) a frusto-conical portion extending upstream from said first sealing surface and having a bevelled second sealing surface; and
   (b) a dish-shaped reinforcing washer convex toward said upstream side and concave toward said downstream side and entirely embedded within said valve member body.

2. The valve member according to claim 1 which includes:
   (a) said reinforcing washer being coaxial with said valve member body.

3. The valve member according to claim 1 which includes:
   (a) a substantially conical flow diverter extending upstream from said frusto-conical portion;
   (b) said annular rim, said frusto-conical portion and said flow diverter being coaxial.

4. The valve member according to claim 3 which includes:
   (a) said frusto-conical portion of said body forming a first base angle; and
   (b) said flow diverter forming a second base angle;
   (c) said first base angle being greater than said second base angle.

5. The valve member according to claim 4 which includes:
   (a) guide means extending from said flow diverter.

6. The valve member according to claim 5 wherein:
   (a) said guide means comprises a plurality of spaced guide fins extending radially from a longitudinal translational axis of said body member.

7. The valve member according to claim 1 which includes:
   (a) said reinforcing washer comprising metal.

8. The valve member according to claim 7 which includes:
   (a) said reinforcing washer having a rough-textured surface.

9. The valve member according to claim 7 which includes:
   (a) a plurality of apertures extending through said reinforcing washer, said apertures being adapted to receive said material comprising said body whereby portions of said body on either side of said reinforcing washer are bonded together.

10. The valve member according to claim 7 which includes:
    (a) said body material being polymeric; and
    (b) said body being unitarily formed.

11. The valve member according to claim 7 which includes:
(a) an opening from said valve member upstream side to said reinforcing washer, said opening being adapted to receive a mechanical positioner for positioning said reinforcing washer in said body when said body is formed.

12. A reinforced mud pump valve member, which comprises:
(a) a body which includes:
  (1) an upstream side;
  (2) a downstream side;
  (3) an annular rim having a first sealing surface;
  (4) a frusto-conical portion extending upstream from said first sealing surface and having a second sealing surface;
  (5) a substantially conical flow diverter extending upstream from said frusto-conical portion;
  (6) a plurality of spaced guide fins extending radially from a longitudinal, translational axis of said valve member body; and
  (7) said body comprising a polymeric material and being unitarily formed; and
(b) a reinforcing washer entirely embedded in said valve member body, said reinforcing washer including:
  (1) a dish-shaped configuration convex toward said valve member body upstream side and concave toward said valve member body downstream side;
  (2) a plurality of apertures extending therethrough for receiving said polymeric material whereby portions of said valve member body on either side of said reinforcing washer are bonded together; and
  (3) a rough textured surface.

* * * * *